United States Patent
Levitsky et al.

(10) Patent No.: US 12,368,480 B2
(45) Date of Patent: Jul. 22, 2025

(54) NETWORK ASSISTED UPLINK TRANSMISSION ANTENNA PORTS SELECTION

(71) Applicant: QUALCOMM Incorporated, San Diego, CA (US)

(72) Inventors: Michael Levitsky, Rehovot (IL); Daniel Paz, Geva Carmel (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 17/653,443

(22) Filed: Mar. 3, 2022

(65) Prior Publication Data

US 2023/0283335 A1  Sep. 7, 2023

(51) Int. Cl.
H04B 7/06 (2006.01)
H04L 5/00 (2006.01)
H04W 24/08 (2009.01)

(52) U.S. Cl.
CPC .......... *H04B 7/061* (2013.01); *H04L 5/0048* (2013.01); *H04W 24/08* (2013.01)

(58) Field of Classification Search
CPC .... H04B 7/061; H04B 7/0639; H04B 7/0691; H04L 5/0048; H04L 5/0044; H04L 5/0092; H04W 24/08
See application file for complete search history.

(56) References Cited

U.S. PATENT DOCUMENTS

| | | | | |
|---|---|---|---|---|
| RE49,595 E * | 8/2023 | Noh | ...................... | H04L 5/0035 |
| | | | | 370/329 |
| 2009/0247229 A1* | 10/2009 | Teo | ...................... | H04B 7/0691 |
| | | | | 455/562.1 |
| 2014/0016475 A1* | 1/2014 | Zhou | ................... | H04W 72/569 |
| | | | | 370/236 |
| 2016/0013847 A1* | 1/2016 | Kim | ..................... | H04B 7/0417 |
| | | | | 375/267 |
| 2019/0207731 A1* | 7/2019 | Park | ..................... | H04B 7/0456 |
| 2020/0162133 A1* | 5/2020 | Harrison | ............... | H04W 52/08 |
| 2021/0314037 A1* | 10/2021 | Rahman | .............. | H04L 25/0226 |
| 2023/0171788 A1* | 6/2023 | Kung | ................... | H04B 7/0695 |
| | | | | 370/329 |
| 2024/0154650 A1* | 5/2024 | Faxér et al. | ......... | H04B 7/0456 |

OTHER PUBLICATIONS

Partial International Search Report—PCT/US2023/063458—ISA/EPO—May 15, 2023.
International Search Report and Written Opinion—PCT/US2023/063458—ISA/EPO—Jul. 6, 2023.

* cited by examiner

*Primary Examiner* — Kodzovi Acolatse
*Assistant Examiner* — Anindita Sen
(74) *Attorney, Agent, or Firm* — Patterson + Sheridan, L.L.P.

(57) ABSTRACT

Certain aspects of the present disclosure provide techniques for network assisted selection of UE antenna ports for uplink transmissions. A method for wireless communication by a user equipment (UE) includes transmitting, to a network entity, a plurality of sounding reference signals over a plurality of UE antenna ports. The method further includes receiving, from the network entity, an indication of one or more antenna port indexes associated with one or more preferred antenna ports for uplink transmissions, and transmitting UE uplink transmissions to the network entity using one or more selected antenna ports of the one or more indicated preferred antenna ports.

25 Claims, 11 Drawing Sheets

600

| | |
|---|---|
| 610 — The strongest | Virtual SRS port index k1 |
| 620 — The 2nd strongest | Virtual SRS port index k2 |
| 630 — The 3rd strongest | Virtual SRS port index k3 |
| 640 — The 4th strongest | Virtual SRS port index k4 |

| | |
|---|---|
| 660 — The strongest port | Virtual SRS port index k1 |
| 670 — The subset of 2 strongest ports | List of 2 virtual SRS port indexes: [k1,k2] |
| 680 — The subset of 4 strongest ports | List of 4 virtual SRS port indexes: [k1,k2,k3,k4] |

*FIG. 6B*

NETWORK ASSISTED UPLINK TRANSMISSION ANTENNA PORTS SELECTION

BACKGROUND

Field of the Disclosure

Aspects of the present disclosure relate to wireless communications, and more particularly, to techniques for selecting antennas for uplink transmissions.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users.

Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a user equipment (UE), including transmitting, to a network entity, a plurality of sounding reference signals over a plurality of UE antenna ports; receiving, from the network entity, an indication of one or more antenna port indexes associated with one or more preferred antenna ports for uplink transmissions; and transmitting, to the network entity using one or more selected antenna ports of the one or more indicated preferred antenna ports, UE uplink transmissions.

One aspect provides a method for wireless communication by a network entity, including receiving, from a user equipment, a plurality of sounding reference signals over a plurality of UE antenna ports; determining, based on the plurality of sounding reference signals, one or more antenna port indexes associated with one or more preferred antenna ports for uplink transmissions; transmitting, to the user equipment, an indication of the one or more antenna port indexes; and receiving, from the user equipment, the uplink transmissions using one or more selected antenna ports of the one or more indicated preferred antenna ports.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 6A depicts an example of a ranked list of antenna port indexes, according to various aspects described herein.

FIG. 6B depicts an example of a list of subsets of ranked antenna port indexes, according to various aspects described herein.

DETAILED DESCRIPTION

Figure 1:
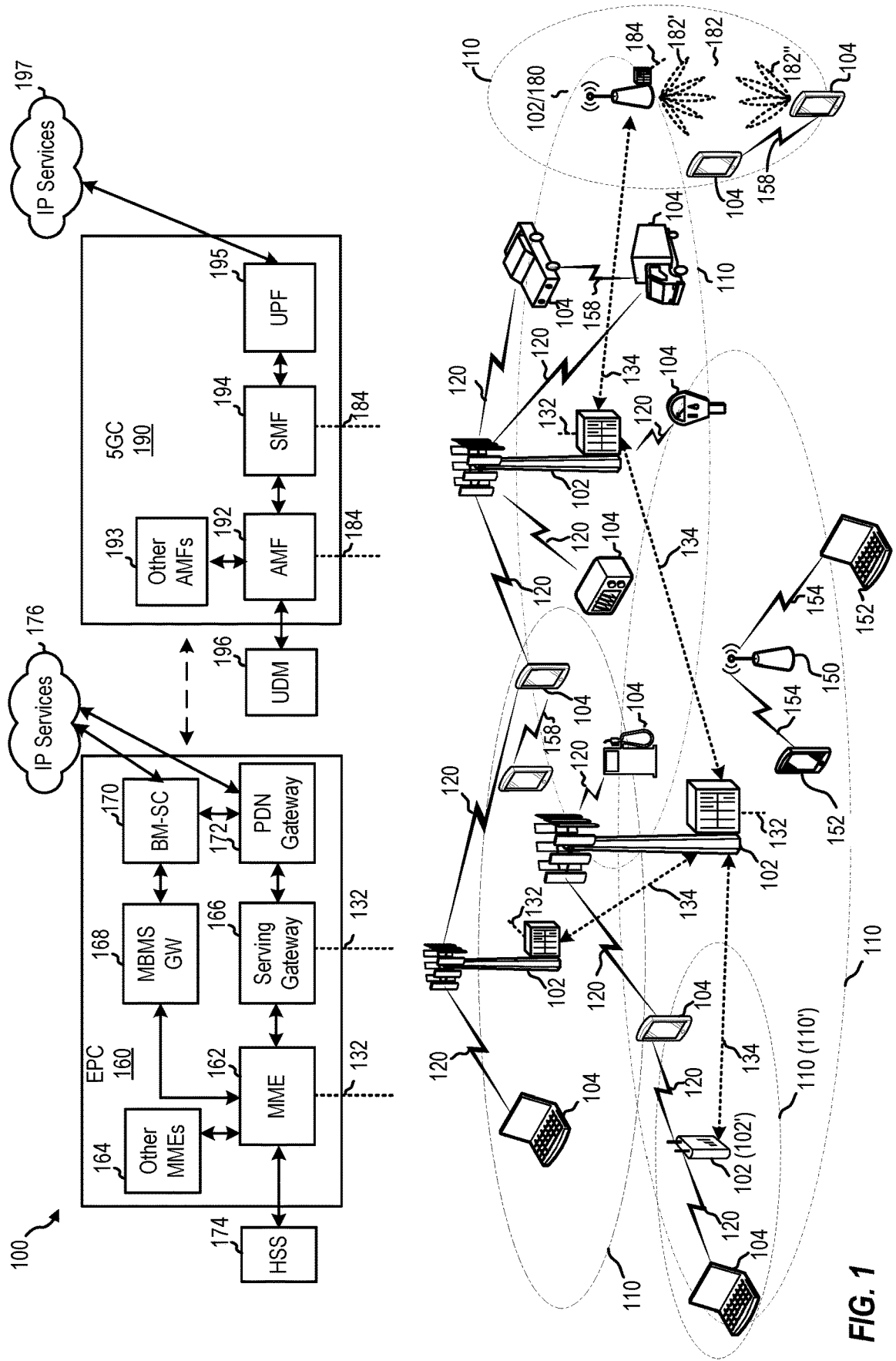
FIG. 1 depicts an example wireless communication network.

Aspects of the present disclosure provide apparatuses, methods, processing systems, and computer-readable mediums for selecting antennas or antenna ports for uplink transmissions, and in particular for network assisted uplink transmission antenna ports selection for user equipments.

A user equipment (UE) may have more receiving (Rx) side antennas in use than transmitting (Tx) side antennas (e.g., due to the Tx side having a lower number of available digital chains/antenna ports). Consequently, when selecting antennas for the Tx side, a UE may have to perform a down-selection of available antenna ports to determine a subset of antenna ports for use on the Tx side (e.g., in uplink (UL) transmissions). Additionally, different UL transmissions utilize a different number of Tx antenna ports, which also requires the UE to perform down-selection of available antenna ports. This down-selection may allow to a UE to employ, for example, antenna selection techniques and antenna diversity techniques.

Antenna selection may be the preferred option for a more static antenna imbalance and a more static channel scenarios. Antenna selection techniques may rely on a downlink (DL)/UL reciprocity assumption (e.g., the same channel conditions for both uplink and downlink using a given antenna) to select a subset of antenna ports for transmitting based on measured downlink reference signals (i.e., measurements are collected per antenna). Such techniques may have limitations (reciprocity requirement) and drawbacks, such as low responsiveness in antenna reselection due to a limited reference signals periodicity or availability for these measurements in DL, misleading antenna selection results when a single port/polarization DL RS is used for the measurements (while more than one Rx port/antenna is utilized for UL receptions on the NW side which leads to inherent reciprocity assumption violation), and mismatches and lags in antenna selection during sleep modes or after beam switch, bandwidth part (BWP) switch, or similar events.

Antenna diversity (inter or intra slots/allocations/transmissions) may be a better option for fast fading or shadowing scenarios that do not allow the UE to assume a semi-static selection of a more convenient antenna(s) for UL transmission(s). Antenna diversity techniques generally apply different antenna ports to different transmissions, or different parts of the same transmission, in order to gain some diversity across a semi-static antenna selection and utilization. Antenna diversity may be also useful when there is no reliable way to do antenna selection (e.g., no DL/UL reciprocity), however it may be suboptimal for scenarios where a semi-static selection of a most appropriate antenna ports can be applicable.

Aspects of the present disclosure provide a technical improvement to existing UL Tx antenna port selection techniques. In particular, aspects described herein provide for UE uplink transmission antenna port selection with the NW assistance based on antenna switching SRS and/or codebook based SRS. The preferred antenna ports indication may be based on virtual sounding reference signal (SRS) ports indexes that are deterministically mapped/linked to antenna switching or codebook based SRS transmission ports. These virtual SRS ports are defined such that a network entity (e.g., a base station) and a UE side can have a common interpretation/indexing of antenna ports involved in SRS transmission for different SRS types and configuration scenarios. Correspondingly, a NW can measure SRS sent by a UE and indicate back to the UE a list of the best SRS ports (i.e. virtual SRS antenna port indexes). The indicated SRS ports can be interpreted correctly on the UE side to determine the best antenna port(s) to use for uplink transmissions. This solution provides the UE the ability to select the best subset of Tx antenna ports even in a non-reciprocal DL/UL scenarios (i.e. when DL RS measurements cannot be used for UL antenna(s) selection). Aspects described herein may further provide improved robustness, accuracy and responsiveness of antenna selection in reciprocal DL/UL scenarios, and thus may be complementary to existing antenna selection techniques.

The improved UL Tx antenna port selection provided by aspects described herein results in technical performance benefits, such as reduced power use by the UE due to reduced DL measurements and greater UL reliability, and improved efficiency of spectrum use and UL coverage.

Introduction to Wireless Communication Networks

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

FIG. 1 depicts an example of a wireless communication network 100, in which aspects described herein may be implemented.

Generally, wireless communication network 100 includes various network entities (alternatively, network elements or network nodes). A network entity is generally a communications device and/or a communication function performed by a communications device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
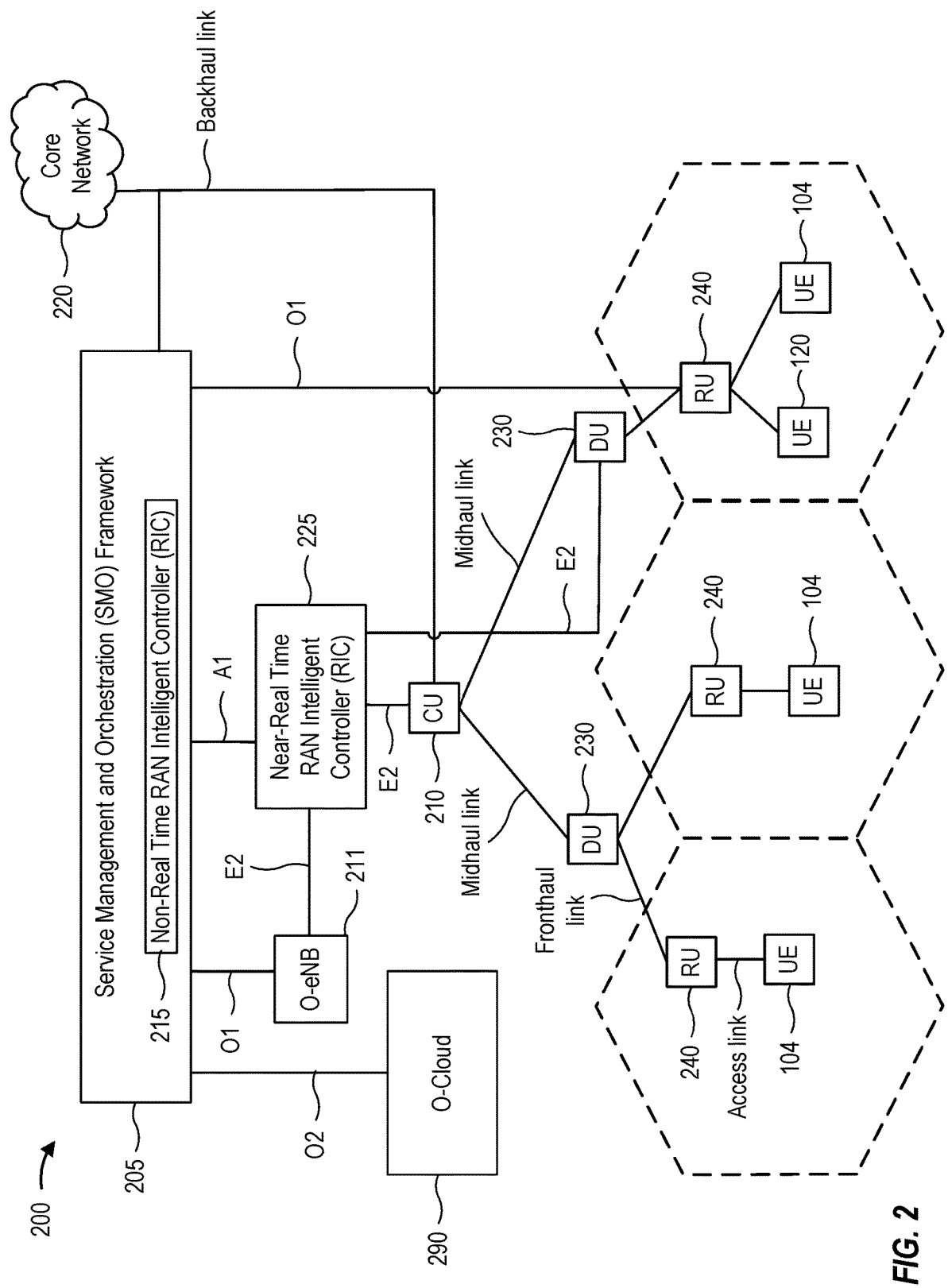
FIG. 2 depicts an example disaggregated base station architecture.

While BSs 102 are depicted in various aspects as unitary communications devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182''. UE 104 may also transmit a beamformed signal to the base station 180 in one or more transmit directions 182''. BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
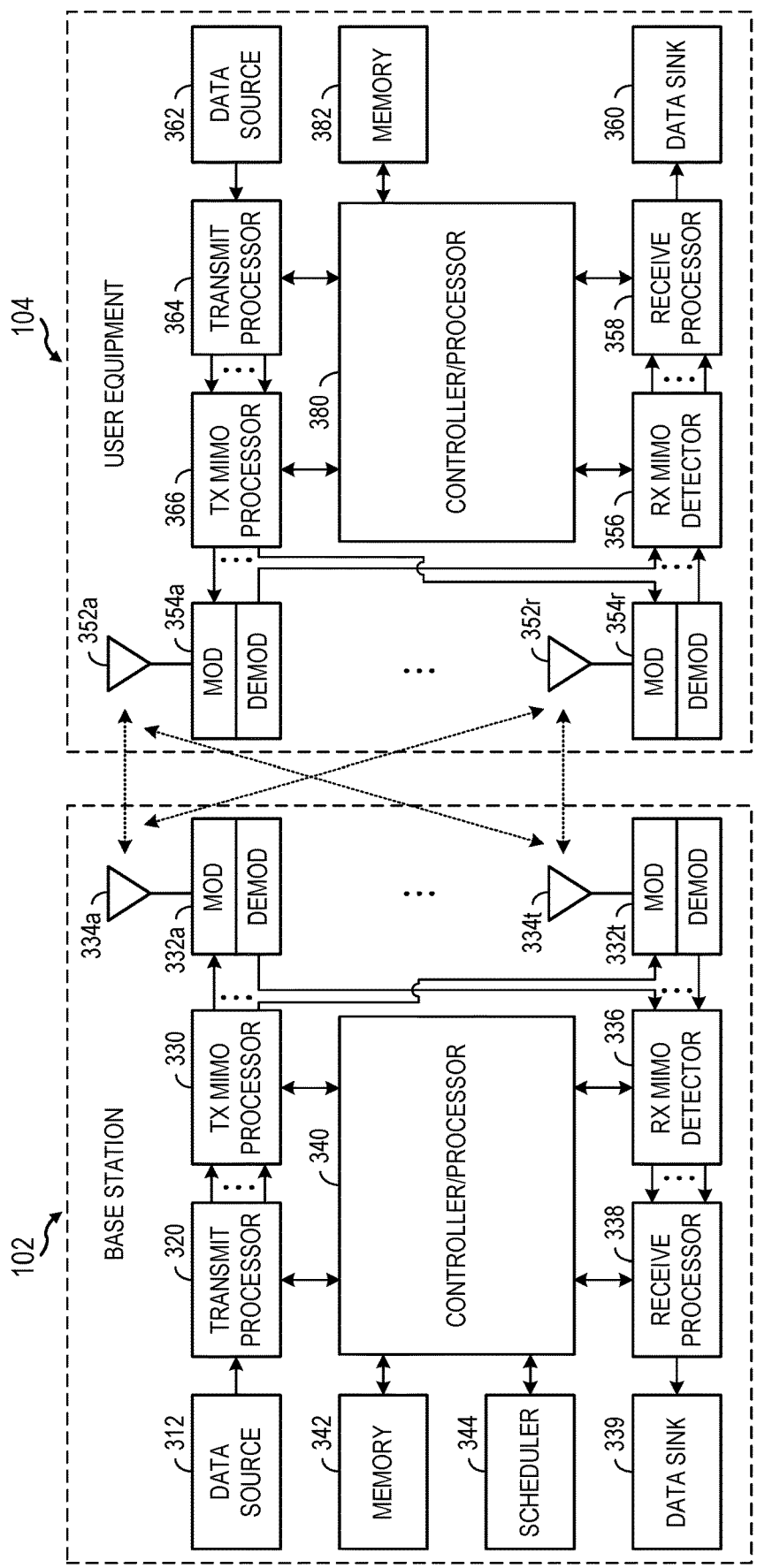
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., data source 362) and wireless reception of data (e.g., data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communication network, such as wireless communication network 100 of FIG. 1.

Figure 4:
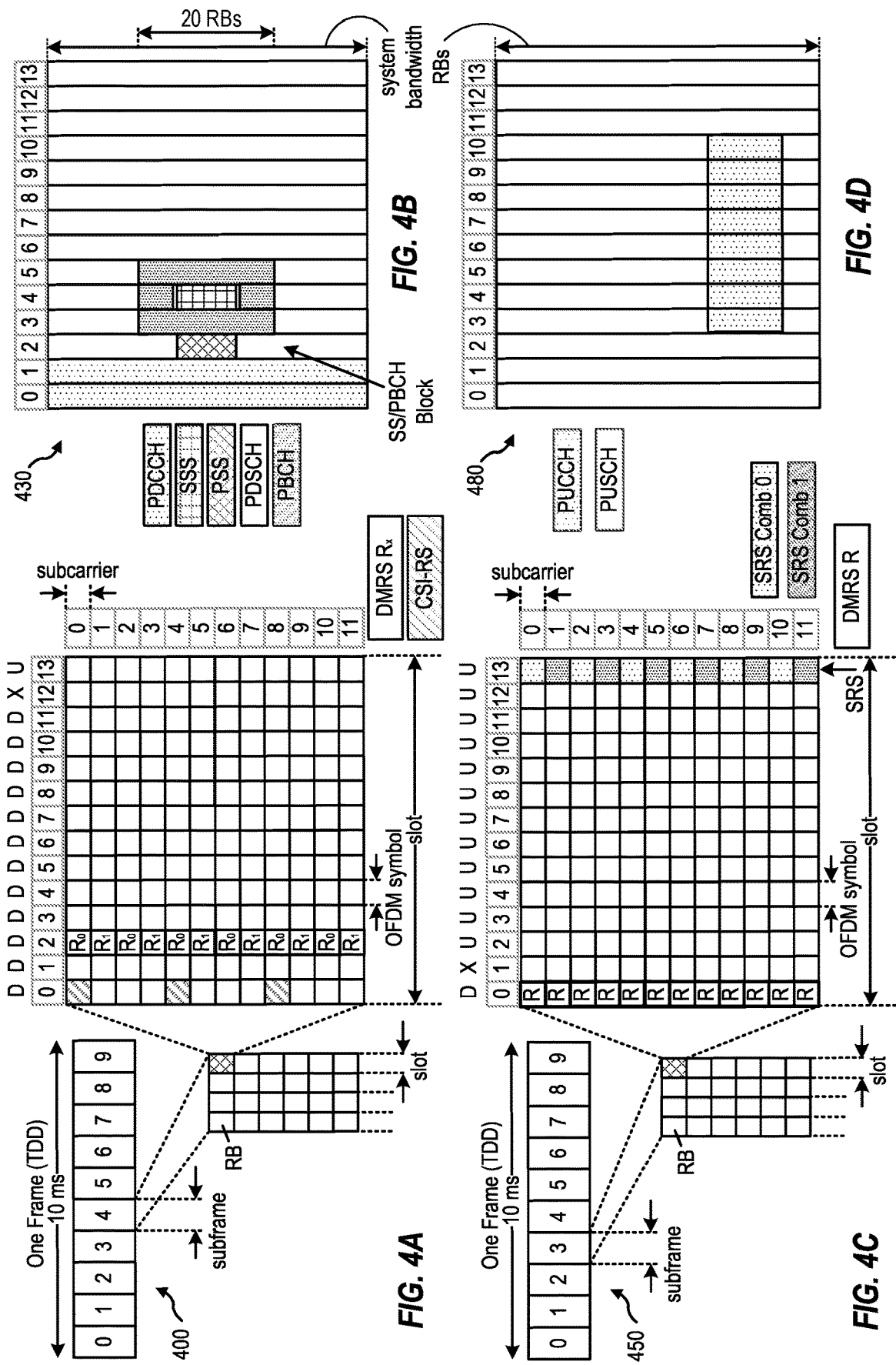
FIGS. 4A, 4B, 4C, and 4D depict various example aspects of data structures for a wireless communication network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 4A and 4C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communication technologies may have a different frame structure and/or different channels.

Generally, the number of slots within a subframe is based on a slot configuration and a numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 4B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Conventional Uplink Transmission Antenna Selection

As mentioned briefly above, a UE may have more antennas in use on the Rx side than on the Tx side. Additionally, different UL transmissions require varying numbers of antenna ports for transmission, as discussed in more detail below. These discrepancies may cause the UE to employ antenna down selection techniques in order to determine which antenna ports to use for UL transmissions. As noted above, conventional down selection techniques include Tx antenna diversity or Tx antenna selection. Antenna selection may be a preferred technique for static antenna imbalance and static channel scenarios, while antenna diversity may be preferred for fast fading or shadowing scenarios that do not allow for selection of the best antenna(s) for every UL allocation.

Different UL transmissions may use different numbers of Tx antenna ports for transmission. Each UL transmission is carried out from an antenna port, which is mapped to a physical antenna. For example, physical uplink control channels (PUCCH) or random-access channel (RACH) transmissions may be performed using a single antenna port. By contrast, some UL transmissions may use multiple antenna ports for transmission. For example, physical uplink shared channels (PUSCH) may use a different number of antenna ports depending on the number of layers supported in UL. Similarly, different types of SRS and SRS resources can also use a different number of antenna ports.

In some scenarios it may be beneficial to employ inter or intra slot antenna port diversity or switching in UL. For instance, different antennas may be used for different transmissions. Alternatively, different antennas may be used for the same transmission. Diversity/switching in UL requires an ability to track the best antenna subset to be involved in these type of transmissions.

UE antenna selection for UL currently can be done based on two options. The first option is autonomous UL antenna selection by a UE based on DL measurements. In some cases, autonomous selection algorithms used by the UE may be specific to the type of antenna and/or type of frequency range of the communication. In some cases, the algorithm may be limited to DL/UL reciprocity scenarios. In addition to being limited to DL/UL reciprocity scenarios, in the case of multiple antenna ports used on the NW side for receiving the UL transmission (which is a typical case), periodic pilots in DL that are transmitted over a single port and are used for measurements which are the basis for an autonomous UL antennas selection on UE side may result in a misleading selection. Finally, when resuming operation after a sleep mode, after beam switch, after a BWP switch, or after CC activation, there is a possibility of mismatches/lags in antenna selection due to lack of opportunity for updated DL measurements.

The second option of autonomous UL antenna selection by a UE is based on a transmit precoding matrix index (TPMI) in case of codebook based PUSCH. Some TPMIs are antenna selection TPMIs and allow some limited antenna down-selection alternative for UL for reciprocal and nonreciprocal DL/UL scenarios. This option provides a partial ability to select the best antenna port (or antenna ports subset) even in case of codebook based PUSCH and when antenna selection TPMI is used/signaled by gNB for PUSCH configuration. There are several reasons for this that are described further. First, this option is limited to partial ability to select the best antenna port or subset, because it cannot address the antenna ports not used by codebook based SRS, thus it does not make its selection based on the entire option of available antennas (because the number of SRS ports is generally lower than the number of available antennas on the UE side, not all antennas are considered).

Second, codebook based precoding options in UL (for PUSCH) that can be selected by the network based on codebook based SRS include also non antenna selection transmit precoding matrix indicator (TPMI) and most of the defined codebook based TPMI options are not antenna selection PMI. Accordingly, in most of cases it will not be possible to figure out the best antenna to be used for PUCCH or for other single Tx UL transmissions based on TPMI for codebook based PUSCH.

Third, even if antenna selection PMI option is used/signaled by the NW, unless it does not select a single antenna, the UE doesn't have a way to determine which antenna port is the best for the transmission out of the subset of antenna ports selected by the TPMI.

Aspects Related to Network Assisted Uplink Transmission Antenna Selection

Given the lack of completeness of the existing alternatives for UE antenna(s) selection for UL, aspects described herein provide an alternative and complementary NW assisted solution for Tx antenna selection for a UE based on SRS. Generally, SRS resources are used for measurements that are done on the NW side for a full set of UE antennas/antenna ports that can be utilized for SRS transmissions (i.e., per UE antenna/SRS port measurements) to enable NW assisted selection of the best UE antennas/antenna ports subset for UL transmissions. Utilizing antenna switching SRS allows for the characterization of UE antennas from the UL perspective and can be used for any scenario (with or without DL/UL reciprocity) for network assisted UL antenna selection for a UE. Similarly, codebook based SRS with the cumulative number of ports equal to the overall number of UE antennas (several codebook SRS resources can be configured for this purpose in some cases) can be also used. Codebook based SRS is a convenient solution for both reciprocal and non-reciprocal channels. Currently, there is no way to convey antenna selection feedback from a NW to a UE based on antenna switching/codebook SRS measurements. However, aspects described herein enable a network to utilize SRS to indicate to the UE the one or more best antenna ports relying on a predefined mapping between SRS types/resources/ports and a predefined (for both UE and NW sides) virtual SRS ports list used for indication of the preferred antenna ports. The indicated virtual SRS ports indexes can be linked by the UE to UE physical antennas used for the corresponding transmissions (this mapping is known only to the UE side).

Generally, aspects described herein may make use of antenna switching SRS (typically applicable for channel sounding purposes for DL/UL reciprocal channel and can be utilized also for UE antennas selection) or codebook based SRS (can be applicable for both reciprocal and not reciprocal channels for UL). In some aspects, the cumulative number of codebook SRS antenna ports is required to be equal to the overall number of UE Rx antennas. All SRS transmission antenna ports are mapped to a list of virtual antenna ports (the mapping can be predefined and will be known to both UE and NW sides) such that the UE can translate the indicated preferred antenna ports/indexes to the affiliated UE physical antennas (used for the corresponding SRS type/resource/port transmission).

Figure 5:
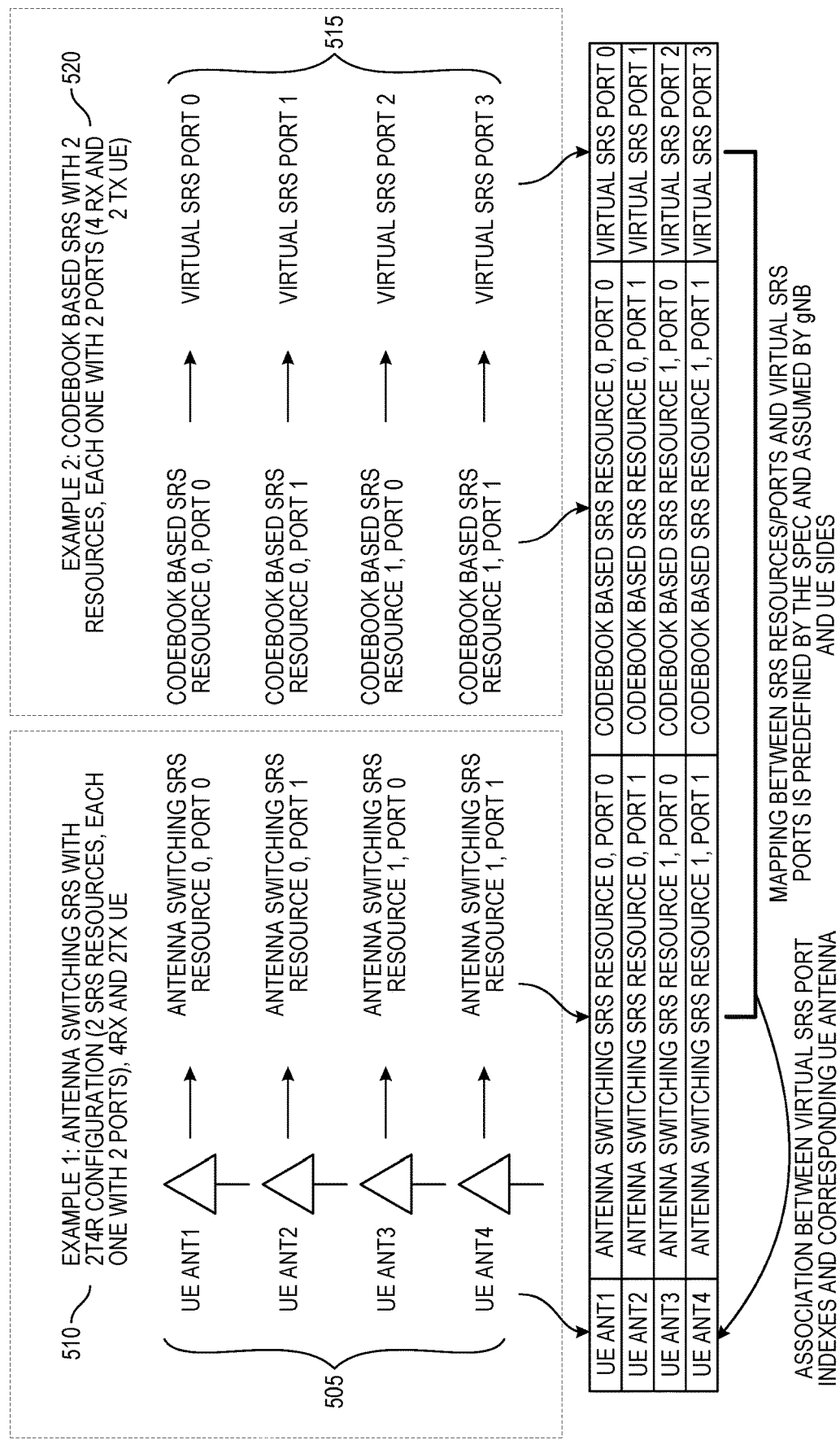
FIG. 5 depicts examples of virtual SRS ports definition and mapping to UE antenna ports for example configuration of antenna switching SRS and codebook based SRS, according to various aspects described herein.

FIG. 5 depicts example 500 of virtual SRS ports definition and mapping to UE antenna ports 505, in case of antenna switching SRS 510 or codebook based SRS 520, to virtual SRS ports 515, according to various aspects described herein.

In the depicted example, mapping for antenna switching SRS 510 assumes 2T4R configuration, comprising 2 SRS resources, each with 2 ports for 4 total ports. The example mapping for codebook based SRS 520 assumes 2 SRS resources, each one with 2 ports. In some aspects, the mapping between SRS resources/ports and virtual SRS ports is predefined by the spec and can be assumed by/known in advance to both the NE and UE.

In one example, a network will determine a list of best virtual SRS ports based on antenna switching SRS or codebook based SRS measurements and will indicate the list to the UE that transmitted the SRS. The best virtual SRS ports indexes may be determined based on, for example, a reference signal received power (RSRP)/signal quality metric estimated per SRS port. This list of the best virtual SRS ports may generally include some number of best ports, such as n best ports. The association between these virtual SRS port indexes (indicated by the NW to the UE) and corresponding UE antenna indexes is known to the UE. Therefore, the UE can take the indication from the network and determine the best antennas to use for an uplink transmission.

Depending on the transmission type and a transmission scenario, a UE may select a number of best antennas to use. For example, the UE may determine a single best antenna to use for transmissions, such as for PUCCH, RACH, PUSCH with reduced power mode, Doppler tracking SRS, or beam management SRS transmissions. In another example, the UE may determine a subset of best antennas to use (e.g., some number of antennas, such as the 2 or 4 best antennas) for transmissions of a different type.

FIG. 6A depicts an example format 600 for a ranked list of virtual SRS port indexes. This format option presents a list of the best virtual SRS ports, ranked from strongest to weakest by a network entity.

For example, the strongest virtual SRS port 610 is at the top of the ranked list, with the second strongest virtual SRS port 620, third strongest virtual SRS port 630, and fourth strongest virtual SRS port 640 listed in descending order. This format of indication to the UE is generally efficient in terms of overhead for transmission because only up to four total indexes need to be indicated. However, the ordinal character of the ranked list 600 format may require a network to more frequently refresh the entire list in order to update the best antennas due to changing channel conditions.

FIG. 6B depicts an example indication format 650 that includes a list of subsets of ranked antenna virtual SRS port indexes. In this example, the first entry indicates the best virtual SRS port 660, the second entry indicates a subset of the 2 strongest ports 670, and the third entry indicates a subset of the 4 strongest ports 680. This option requires more overhead, because it includes seven total indexes, as compared to the four of the first option 600 discussed above. However, this option may require less entire table updating, because more of the entries will stay valid for longer. By way of example, if the order of k1 and k2 in entry two changes, the subset of indexes is nevertheless still correct because the best two virtual SRS ports are being indicated without regard to relative ordering between them.

Note that example formats 600 and 650 are based on four virtual port indexes, k1-k4, but any number of virtual SRS port indexes could be used in other examples.

Because the association between the virtual SRS port indexes and the UE antenna indexes is known by the UE, the UE can determine the best antenna subset to use for UL transmissions based on the indication by the NE of the best virtual SRS ports, using, for example, either format 600 or format 650.

In some aspects, an indication of the best virtual SRS ports (e.g., in a format like 600 or 650) will be indicated to a UE dynamically with a rate lower or equal to SRS periodicity/allocation/scheduling rate, in order to provide continuously updated indexes. In one aspect, a MAC-CE based indication may be used. In such an aspect, a single MAC-CE can provide the entire list of best virtual SRS ports, or several MAC-CEs can be used, wherein each one updates a specific cell or entry of the list (e.g., entry 610-640 or 660-670). In another aspect, a non-scheduling DCI based indication can be used.

In some aspects with a reciprocal channel, the proposed approach can be used complementary to other autonomous algorithms used by a UE for autonomous antenna selection. For example, a UE may be configured to utilize the network-assisted Tx antennas selection and DL based autonomous Tx antenna selection algorithms in order to determine which antennas to use for the UL transmission. In some aspects, the network-assisted UE Tx antenna selection may be prioritized, such as when a UE has a limited opportunity or ability to measure DL reference signals for autonomous Tx antennas selection. This condition may happen, for example, after a long sleep time, after Tx/Rx beam change, after bandwidth part (BWP) switching, or during or after CC activation.

Example Operations of Entities in a Communication Network

Figure 7:
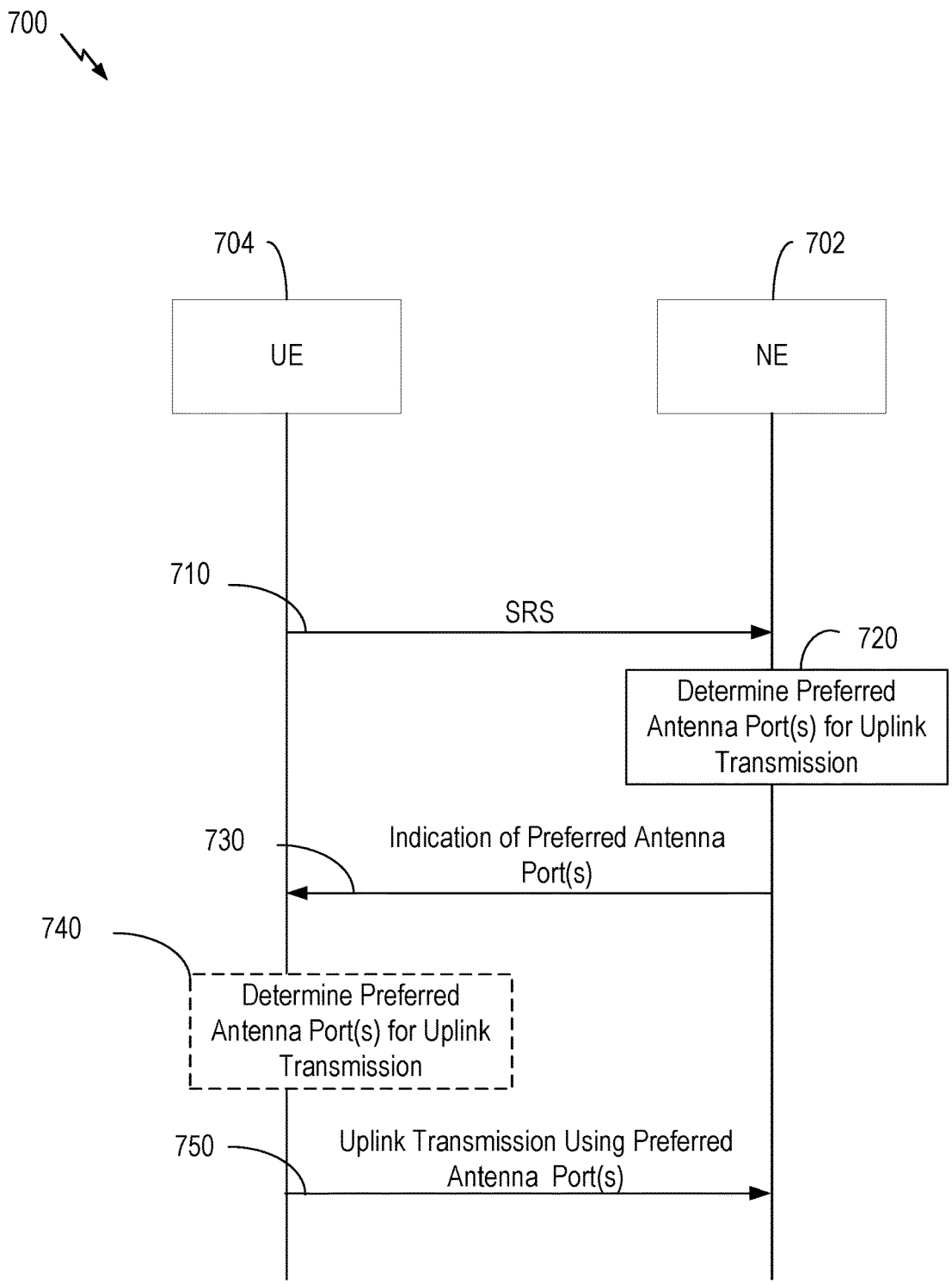
FIG. 7 depicts a process flow for communication in a network between a network entity and a user equipment, according to various aspects described herein.

FIG. 7 depicts a process flow 700 for communication in a network between a network entity 702 and a user equipment (UE) 704. In some aspects, the network entity 702 may be an example of a base station (BS), such as BS 102 depicted and described with respect to FIGS. 1 and 3, or a disaggregated BS 200 depicted and described with respect to FIG. 2. Similarly, the UE 704 may be an example of UE 104 depicted and described with respect to FIGS. 1 and 3. However, in other aspects, UE 104 may be another type of wireless communications device, and BS 102 may be another type of network entity or network node, such as those described herein.

As illustrated, the process flow 700 illustrated in FIG. 7 begins at operation 710 with the UE 704 transmitting a plurality of SRS to the NE 702. In one aspect, the plurality of SRS comprises antenna switching SRS resources. In another aspect, the plurality of SRS comprises codebook based SRS resources. The plurality of SRS resources (each one having some number of ports) are mapped to a plurality of virtual SRS ports to be used as a common basis for SRS ports indexes interpretation and indication from the NW to the UE, as depicted in FIG. 5.

Thereafter, in operation 720, the NE 702 determines one or more preferred SRS ports or virtual antenna ports for UE uplink transmissions. The one or more preferred SRS/virtual antenna ports for UE uplink transmissions is determined based on the received plurality of SRS resources/ports.

Thereafter, in operation 730, the NE 702 transmits an indication of one or more virtual antenna port indexes associated with the one or more preferred antenna ports for uplink transmissions to the UE 704. In one aspect, the indication comprises a ranked list of antenna port indexes, as depicted in FIG. 6A. For example, the ranked list may order the some number n of best virtual SRS ports. In another aspect, the indication comprises a list of subsets of ranked antenna port indexes, as depicted in FIG. 6B. For example, the list of subsets of ranked antenna port indexes may order the strongest port, subset of 2 strongest ports, subset of 4 strongest ports, and so on, depending on some total number of ranked ports n.

In one aspect, the indication of one or more antenna port indexes is comprised within a medium access control-control element (MAC-CE). In another aspect, the indication of one or more antenna port indexes is comprised within downlink control information. The downlink control information may comprise nonscheduled downlink control information.

In one aspect, at operation 740, the UE 704 determines one or more selected antenna ports for UE uplink transmissions based at least in part on the indication from the network entity 702 at operation 730. In some aspects, the one or more selected antenna ports for UE uplink transmissions are determined based on the indication from the network entity 702 after a threshold period of time has elapsed since measuring a downlink reference signal. In some aspects, the threshold period of time may occur before a relevant DL RS measurement opportunity. For example, the threshold period of time may occur after a beam switch, BWP switch, or CC activation.

In one aspect (not shown), the one or more selected antenna ports for the uplink transmission are determined based at least in part on an antenna selection algorithm performed by the user equipment 704. This optional selection utilizes both the indication of one or more antenna port indexes as transmitted by the NE 702 in operation 730, in addition to an autonomous UE side on-board algorithm which relies on DL RS measurements. In case of autonomous Tx antenna selection algorithm on UE side, the user equipment 704 measures one or more downlink references signals, and provides the measurements of the one or more downlink reference signals to the antenna selection algorithm, in order to determine the one or more selected antenna ports for the uplink transmission. The two different solutions for UE Tx antenna selection (NW assisted or autonomous selection on UE side) can be used complementary for different scenarios and different time periods. In case of non-reciprocal channel, autonomous UE antenna selection cannot be applicable. In some cases, UE may waive on DL RS measurements, or may reduce the measurements rate for power saving or longer sleep time duration or other considerations. For these time periods, NW assisted UE Tx antenna selection will be used. In some cases, DL RS measurements will not be up-to-date or may not be reliable and robust enough and for these scenarios, and NW assisted antenna ports selection can be the primary source for UE Tx antenna selection decisions. In some aspects, both antenna selection algorithms can be used for increased accuracy, robustness and responsiveness of UE Tx antenna selection decisions taken on the UE side.

Thereafter, in operation 750, the UE 704 transmits an uplink transmission to the base station 702, using one or more antennas corresponding to the indicated one or more preferred antenna ports, as deciphered from the mapping discussed earlier.

Example Operations of a User Equipment

Figure 8:
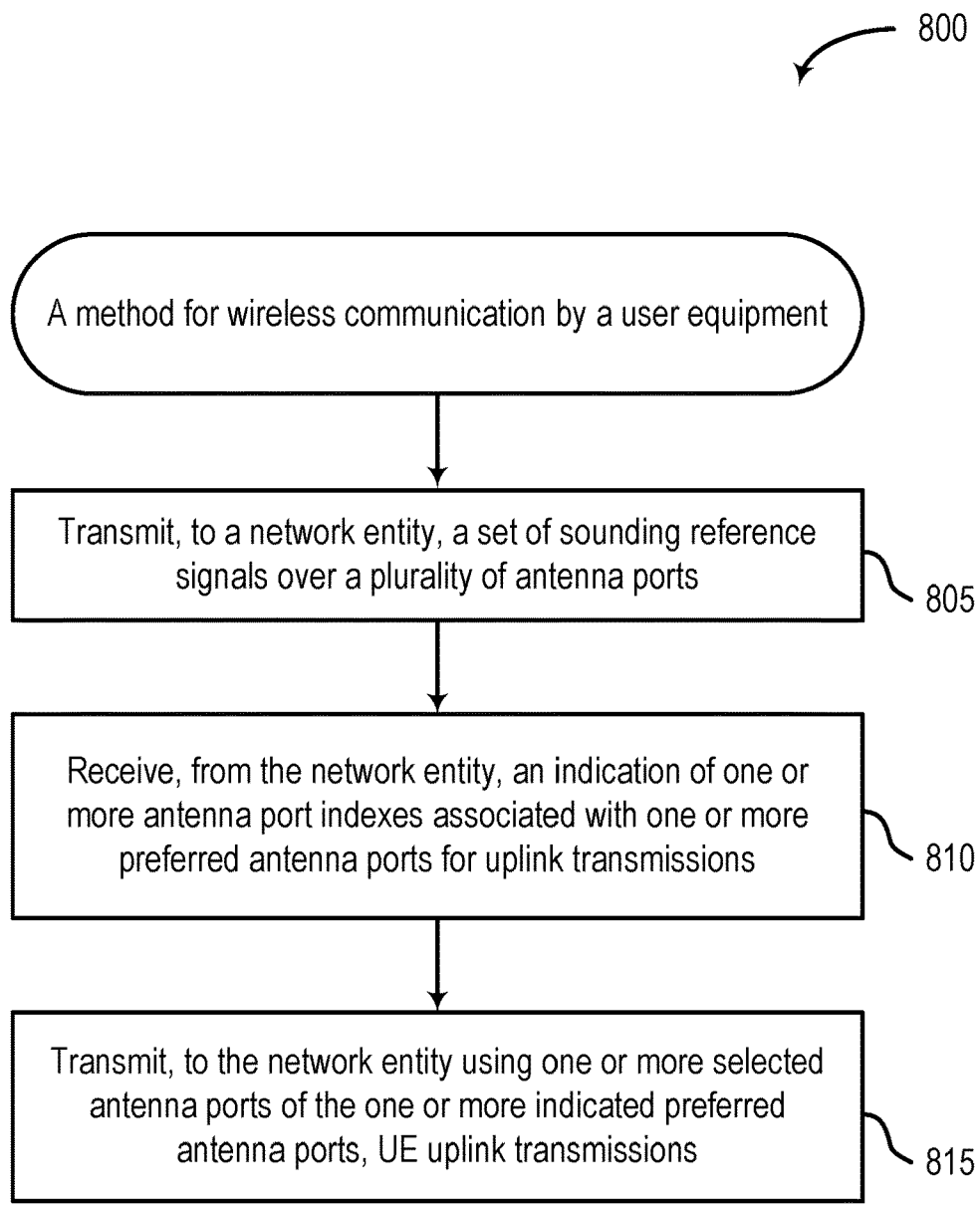
FIG. 8 depicts a method for wireless communication.

FIG. 8 shows a method 800 for wireless communication by a UE, such as UE 104 of FIGS. 1 and 3.

Method 800 begins at 805 with transmitting, to a network entity, a set of sounding reference signals over a plurality of antenna ports. In some cases, the operations of this step refer to, or may be performed by, SRS transmission circuitry as described with reference to FIG. 10.

In some aspects, the plurality of sounding reference signals comprises antenna switching sounding reference signal resources.

In some aspects, the plurality of sounding reference signals comprises codebook-based sounding reference signal resources.

In some aspects, the plurality of sounding reference signals is mapped to a plurality of virtual sounding reference signal ports.

Method 800 then proceeds to step 810 with receiving, from the network entity, an indication of one or more antenna port indexes associated with one or more preferred antenna ports for uplink transmissions. In some cases, the operations of this step refer to, or may be performed by, antenna port configuration circuitry as described with reference to FIG. 10.

In some aspects, the indication of the one or more antenna port indexes comprises a ranked list of antenna port indexes. In some aspects, the indication of the one or more antenna port indexes comprises a list of subsets of ranked antenna port indexes.

Method 800 then proceeds to step 815 with transmitting, to the network entity using one or more in antenna ports of the one or more indicated preferred antenna ports, UE uplink transmissions. In some cases, the operations of this step refer to, or may be performed by, uplink transmission circuitry as described with reference to FIG. 10.

In some aspects, method 800 further includes determining the one or more selected antenna ports for uplink transmissions based at least in part on the indication from the network entity. In some aspects, the one or more selected antenna ports for the uplink transmission are determined based on the indication from the network entity after a threshold period of time has elapsed since measuring a downlink reference signal. In some aspects, the threshold period of time occurs before a relevant downlink reference signal measurement opportunity.

In some aspects, the one or more selected antenna ports for the uplink transmission are determined based at least in part on an antenna selection algorithm performed by the user equipment. In some aspects, method 800 further includes measuring one or more downlink reference signals. In some aspects, method 800 further includes providing measurements of the one or more downlink reference signals to the antenna selection algorithm.

In some aspects, the indication of one or more antenna port indexes is comprised within a medium access control-control element. In some aspects, the indication of one or more antenna port indexes is comprised within downlink control information. In some aspects, the downlink control information is non scheduling downlink control information.

Figure 10:
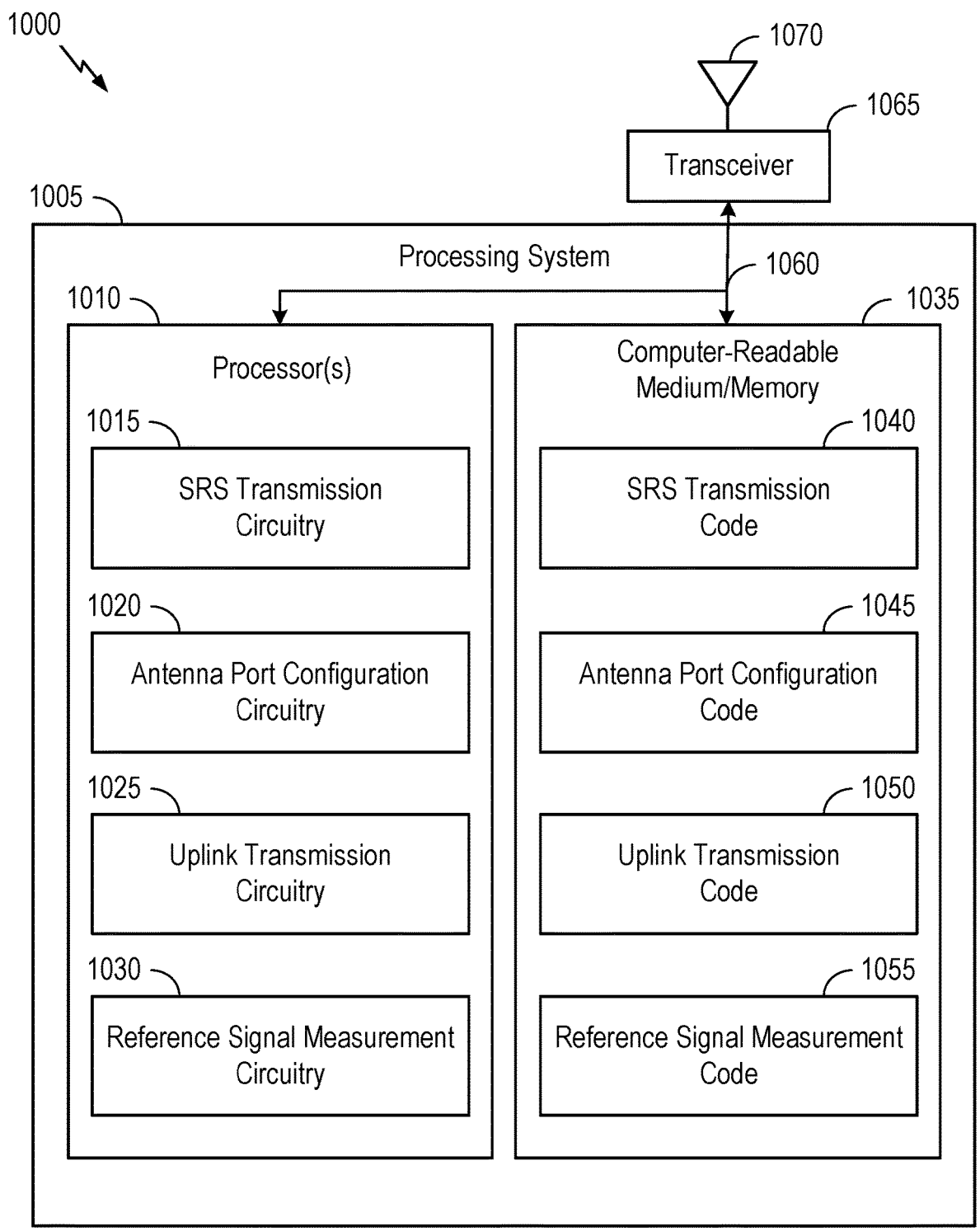
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Example Operations of a Network Entity

Figure 9:
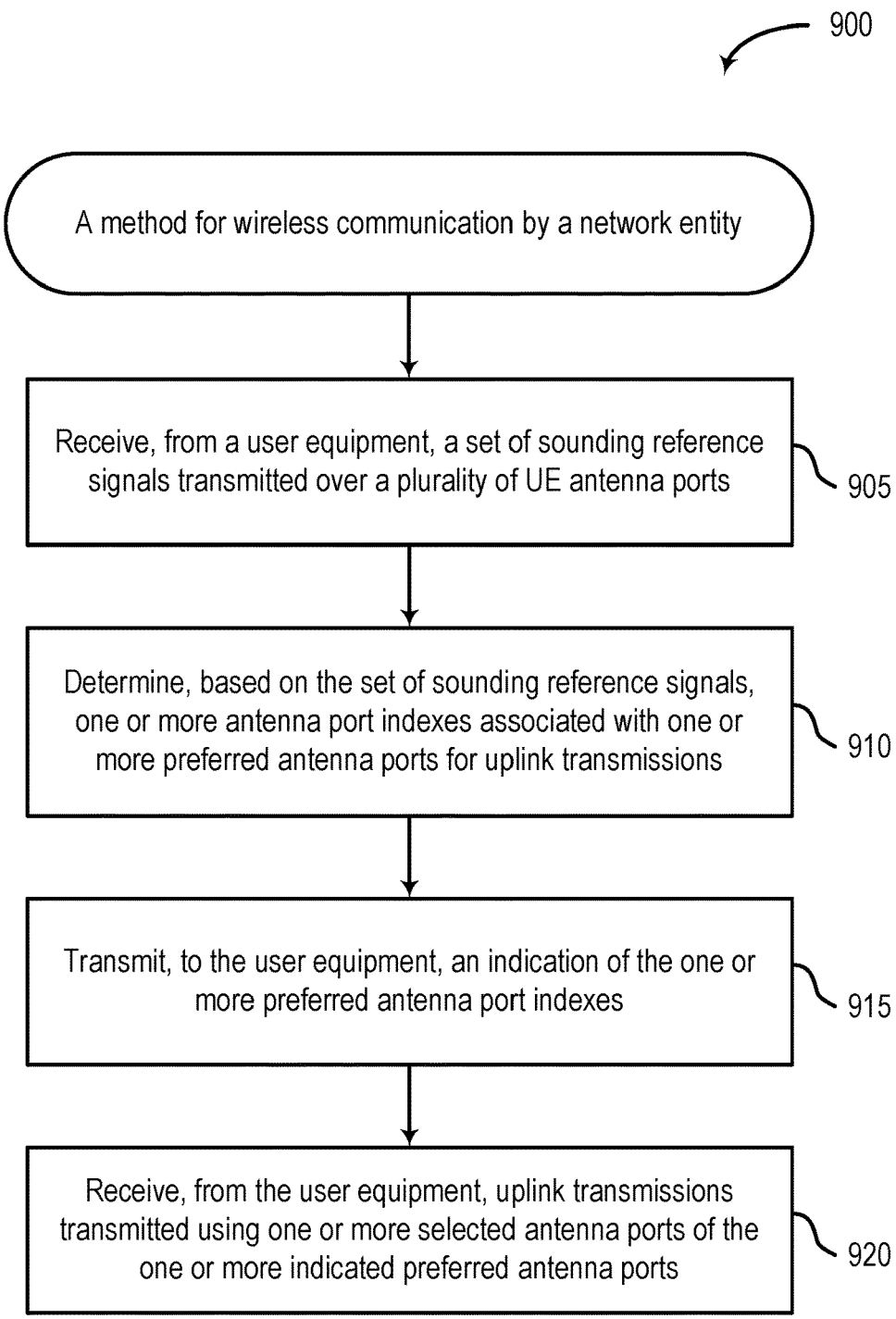
FIG. 9 depicts a method for wireless communication.

FIG. 9 shows a method 900 for wireless communication by a network entity, such as BS 102 of FIGS. 1 and 3, or a disaggregated base station as discussed with respect to FIG. 2.

Method 900 begins at 905 with receiving, from a user equipment, a plurality of sounding reference signals transmitted over a plurality of UE antenna ports. In some cases, the operations of this step refer to, or may be performed by, SRS reception circuitry as described with reference to FIG. 11.

Method 900 then proceeds to step 910 with determining, based on the set of sounding reference signals, one or more antenna port indexes associated with one or more preferred antenna ports for uplink transmissions. In some cases, the operations of this step refer to, or may be performed by, antenna port indexing circuitry as described with reference to FIG. 11.

Method 900 then proceeds to step 915 with transmitting, to the user equipment, an indication of the one or more antenna port indexes. In some cases, the operations of this step refer to, or may be performed by, antenna port indication circuitry as described with reference to FIG. 11.

Method 900 then proceeds to step 920 with receiving, from the user equipment, the uplink transmissions using one or more selected antenna ports of the one or more indicated preferred antenna ports. In some cases, the operations of this step refer to, or may be performed by, uplink reception circuitry as described with reference to FIG. 11.

In some aspects, the plurality of sounding reference signals comprises antenna switching sounding reference signals. In some aspects, the plurality of sounding reference signals comprises codebook-based sounding reference signals. In some aspects, the plurality of sounding reference signals is mapped to a plurality of virtual sounding reference signal ports. In some aspects, the indication of the one or more antenna port indexes comprises a ranked list of antenna port indexes. In some aspects, the indication of the one or more antenna port indexes comprises a list of subsets of ranked antenna port indexes. In some aspects, the indication of the one or more antenna port indexes is comprised within a medium access control-control element. In some aspects, the indication of the one or more antenna port indexes is comprised within downlink control information. In some aspects, the downlink control information is non scheduling downlink control information.

Figure 11:
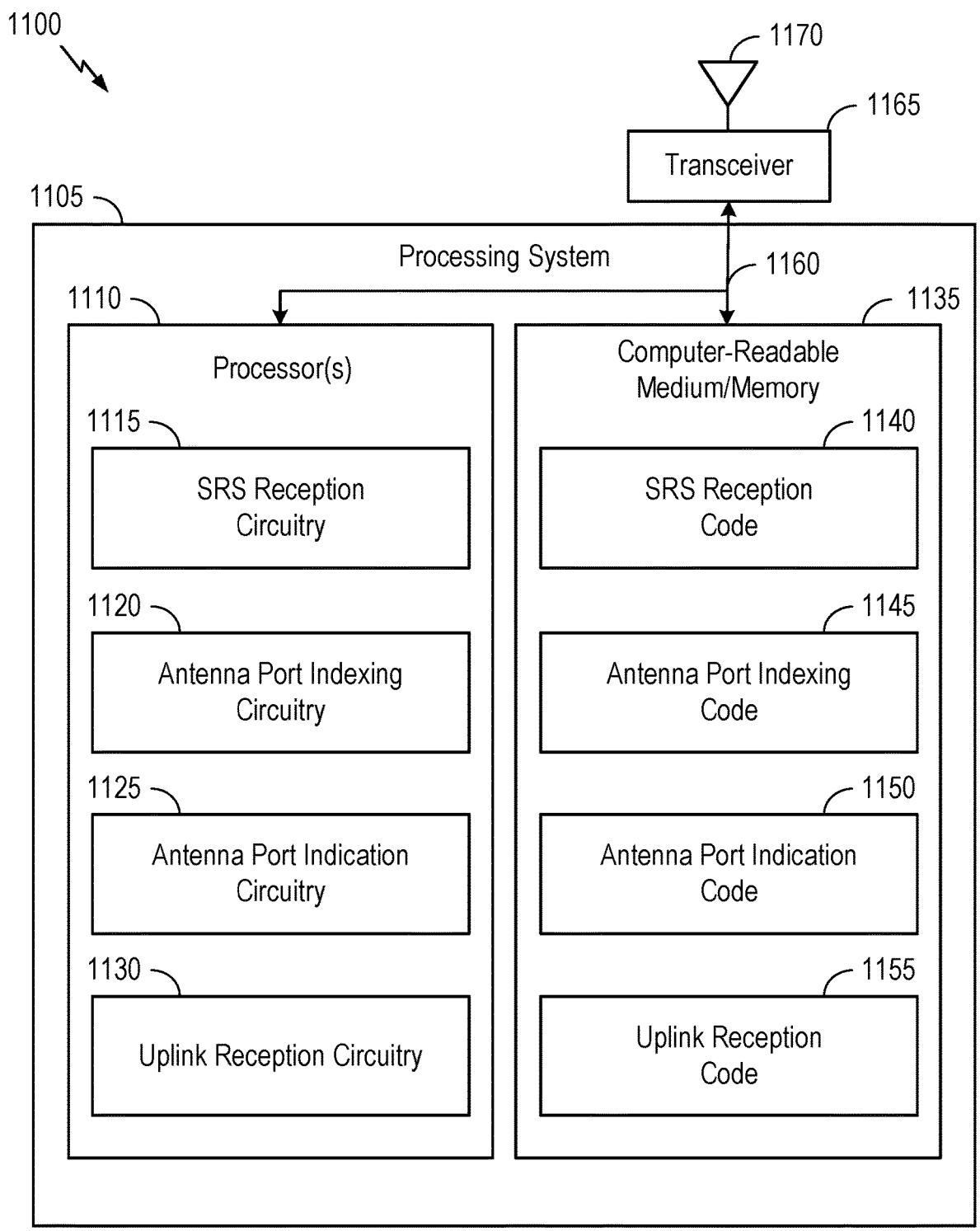
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Communications Devices

FIG. 10 depicts aspects of an example communications device 1000. In some aspects, communications device 1000 is a user equipment, such as UE 104 described above with respect to FIGS. 1 and 3.

The communications device 1000 includes a processing system 1005 coupled to the transceiver 1065 (e.g., a transmitter and/or a receiver). The transceiver 1065 is configured to transmit and receive signals for the communications device 1000 via the antenna 1070, such as the various signals as described herein. The processing system 1005 may be configured to perform processing functions for the communications device 1000, including processing signals received and/or to be transmitted by the communications device 1000.

The processing system 1005 includes one or more processors 1010. In various aspects, the one or more processors 1010 may be representative of one or more of receive processor 358, transmit processor 364, TX MIMO processor 366, and/or controller/processor 380, as described with respect to FIG. 3. The one or more processors 1010 are coupled to a computer-readable medium/memory 1035 via a bus 1060. In certain aspects, the computer-readable medium/memory 1035 is configured to store instructions (e.g., computer-executable code) that when executed by the one or more processors 1010, cause the one or more processors 1010 to perform the method 800 described with respect to FIG. 8, or any aspect related to it. Note that reference to a processor performing a function of communications device 1000 may include one or more processors 1010 performing that function of communications device 1000.

In the depicted example, computer-readable medium/memory 1035 stores code (e.g., executable instructions), such as SRS transmission code 1040, antenna port configuration code 1045, uplink transmission code 1050, and reference signal measurement code 1055. Processing of the SRS transmission code 1040, antenna port configuration code 1045, uplink transmission code 1050, and reference signal measurement code 1055 may cause the communications device 1000 to perform the method 800 described with respect to FIG. 8, or any aspect related to it.

The one or more processors 1010 include circuitry configured to implement (e.g., execute) the code stored in the computer-readable medium/memory 1035, including circuitry such as SRS transmission circuitry 1015, antenna port configuration circuitry 1020, uplink transmission circuitry 1025, and reference signal measurement circuitry 1030. Processing with SRS transmission circuitry 1015, antenna port configuration circuitry 1020, uplink transmission circuitry 1025, and reference signal measurement circuitry 1030 may cause the communications device 1000 to perform the method 800 described with respect to FIG. 8, or any aspect related to it.

Various components of the communications device 1000 may provide means for performing the method 800 described with respect to FIG. 8, or any aspect related to it. For example, means for transmitting, sending or outputting for transmission may include transceivers 354 and/or antenna(s) 352 of the UE 104 illustrated in FIG. 3 and/or the transceiver 1065 and the antenna 1070 of the communications device 1000 in FIG. 10. Means for receiving or obtaining may include transceivers 354 and/or antenna(s) 352 of the UE 104 illustrated in FIG. 3 and/or the transceiver 1065 and the antenna 1070 of the communications device 1000 in FIG. 10.

According to some aspects, SRS transmission circuitry 1015 in configured to transmit, to a network entity, a set of sounding reference signals. According to some aspects, antenna port configuration circuitry 1020 is configured to receive, from the network entity, an indication of one or more antenna port indexes associated with one or more preferred antenna ports for an uplink transmission. According to some aspects, uplink transmission circuitry 1025 is configured to transmit, to the network entity using one or more selected antenna ports of the one or more preferred antenna ports, the uplink transmission.

In some aspects, the set of sounding reference signals comprises antenna switching sounding reference signals. In some aspects, the set of sounding reference signals comprises codebook-based sounding reference signals. In some aspects, the set of sounding reference signals is mapped to a set of virtual sounding reference signal ports. In some aspects, the indication of the one or more antenna port indexes comprises a ranked list of antenna port indexes. In some aspects, the indication of the one or more antenna port indexes comprises a ranked list of subsets of antenna port indexes.

In some examples, antenna port configuration circuitry 1020 is configured to determine the one or more selected antenna ports for the uplink transmission based on the indication from the network entity. In some aspects, the one or more selected antenna ports for the uplink transmission are determined based on the indication from the network entity after a threshold period of time has elapsed since measuring a downlink reference signal. In some aspects, the one or more selected antenna ports for the uplink transmission are determined based on an antenna selection algorithm performed by the user equipment.

According to some aspects, reference signal measurement circuitry 1030 is configured to measure one or more downlink reference signals. In some examples, reference signal measurement circuitry 1030 is configured to provide measurements of the one or more downlink reference signals to the antenna selection algorithm. In some aspects, the indication of one or more antenna port indexes is comprised within a medium access control-control element. In some aspects, the indication of one or more antenna port indexes is comprised within downlink control information.

FIG. 11 depicts aspects of an example communications device 1100. In some aspects, communications device 1100 is a network entity, such as BS 102 described above with respect to FIGS. 1 and 3.

The communications device 1100 includes a processing system 1105 coupled to the transceiver 1165 (e.g., a transmitter and/or a receiver). The transceiver 1165 is configured to transmit and receive signals for the communications device 1100 via the antenna 1170, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1135 via a bus 1160. In certain aspects, the computer-readable medium/memory 1135 is configured to store instructions (e.g., computer-executable code) that when executed by the one or more processors 1110, cause the one or more processors 1110 to perform the method 900 described with respect to FIG. 9, or any aspect related to it. Note that reference to a processor of communications device 1100 performing a function may include one or more processors 1110 of communications device 1100 performing that function.

In the depicted example, the computer-readable medium/memory 1135 stores code (e.g., executable instructions), such as SRS reception code 1140, antenna port indexing code 1145, antenna port indication code 1150, and uplink reception code 1155. Processing of the SRS reception code 1140, antenna port indexing code 1145, antenna port indication code 1150, and uplink reception code 1155 may cause the communications device 1100 to perform the method 900 described with respect to FIG. 9, or any aspect related to it.

The one or more processors 1110 include circuitry configured to implement (e.g., execute) the code stored in the computer-readable medium/memory 1135, including circuitry such as SRS reception circuitry 1115, antenna port indexing circuitry 1120, antenna port indication circuitry 1125, and uplink reception circuitry 1130. Processing with SRS reception circuitry 1115, antenna port indexing circuitry 1120, antenna port indication circuitry 1125, and uplink reception circuitry 1130 may cause the communications device 1100 to perform the method 900 as described with respect to FIG. 9, or any aspect related to it.

Various components of the communications device 1100 may provide means for performing the method 900 as described with respect to FIG. 9, or any aspect related to it. Means for transmitting, sending or outputting for transmission may include transceivers 332 and/or antenna(s) 334 of the BS 102 illustrated in FIG. 3 and/or the transceiver 1165 and the antenna 1170 of the communications device 1100 in FIG. 11. Means for receiving or obtaining may include transceivers 332 and/or antenna(s) 334 of the BS 102 illustrated in FIG. 3 and/or the transceiver 1165 and the antenna 1170 of the communications device 1100 in FIG. 11.

According to some aspects, SRS reception circuitry 1115 is configured to receive, from a user equipment, a set of sounding reference signals. According to some aspects, antenna port indexing circuitry 1120 is configured to determine, based on the set of sounding reference signals, one or more antenna port indexes associated with one or more preferred antenna ports for an uplink transmission. According to some aspects, antenna port indication circuitry 1125 is configured to transmit, to the user equipment, an indication of the one or more antenna port indexes. According to some aspects, uplink reception circuitry 1130 is configured to receive, from the user equipment, the uplink transmission using one or more selected antenna ports of the one or more preferred antenna ports.

In some aspects, the set of sounding reference signals comprises antenna switching sounding reference signals. In some aspects, the set of sounding reference signals comprises codebook-based sounding reference signals. In some aspects, the set of sounding reference signals is mapped to a set of virtual sounding reference signal ports. In some aspects, the indication of the one or more antenna port indexes comprises a ranked list of antenna port indexes. In some aspects, the indication of the one or more antenna port indexes comprises a ranked list of subsets of antenna port indexes. In some aspects, the indication of the one or more antenna port indexes is comprised within a medium access control-control element. In some aspects, the indication of the one or more antenna port indexes is comprised within downlink control information.

Example Clauses

Implementation examples are described in the following numbered clauses:

Clause 1: A method for wireless communication by a user equipment, comprising: transmitting, to a network entity, a plurality of sounding reference signals over a plurality of UE antenna ports; receiving, from the network entity, an indication of one or more antenna port indexes associated with one or more preferred antenna ports for UE uplink transmissions; and transmitting, to the network entity using one or more selected antenna ports of the one or more indicated preferred antenna ports, the UE uplink transmissions.

Clause 2: The method of Clause 1, wherein the plurality of sounding reference signals comprises antenna switching sounding reference signal resources.

Clause 3: The method of any one of Clauses 1 and 2, wherein the plurality of sounding reference signals comprises codebook-based sounding reference signal resources.

Clause 4: The method of any one of Clauses 1-3, wherein the plurality of sounding reference signals and their associated antenna ports are mapped to a plurality of virtual sounding reference signal ports.

Clause 5: The method of any one of Clauses 1-4, wherein the indication of the one or more antenna port indexes comprises a ranked list of antenna port indexes.

Clause 6: The method of any one of Clauses 1-5, wherein the indication of the one or more antenna port indexes comprises a list of subsets of ranked antenna port indexes.

Clause 7: The method of any one of Clauses 1-6, further comprising: determining the one or more selected antenna ports for the uplink transmission based at least in part on the indication from the network entity.

Clause 8: The method of Clause 7, wherein the one or more selected antenna ports for the uplink transmission are determined based on the indication from the network entity after a threshold period of time has elapsed since measuring a downlink reference signal.

Clause 9: The method of Clause 8, wherein the threshold period of time occurs before a relevant downlink reference signal measurement opportunity.

Clause 10: The method of Clause 7, wherein the one or more selected antenna ports for the uplink transmission are determined based at least in part on an uplink antenna port selection algorithm performed by the user equipment.

Clause 11: The method of Clause 10, further comprising: measuring one or more downlink reference signals; and providing measurements of the one or more downlink reference signals obtained per UE antenna or polarization to the uplink antenna port selection algorithm.

Clause 12: The method of any one of Clauses 1-11, wherein the indication of one or more antenna port indexes is comprised within a medium access control-control element.

Clause 13: The method of any one of Clauses 1-12, wherein the indication of one or more antenna port indexes is comprised within downlink control information.

Clause 14: The method of Clause 13, wherein the downlink control information comprises non scheduling downlink control information.

Clause 15: A method for wireless communication by a network entity, comprising: receiving, from a user equipment, a plurality of sounding reference signals over a plurality of UE antenna ports; determining, based on the plurality of sounding reference signals, one or more antenna port indexes associated with one or more preferred antenna ports for uplink transmissions; transmitting, to the user equipment, an indication of the one or more antenna port indexes; and receiving, from the user equipment, the uplink transmissions using one or more selected antenna ports of the one or more preferred antenna ports.

Clause 16: The method of Clause 15, wherein the plurality of sounding reference signals comprises antenna switching sounding reference signal resources.

Clause 17: The method of any one of Clauses 15 and 16, wherein the plurality of sounding reference signals comprises codebook-based sounding reference signal resources.

Clause 18: The method of any one of Clauses 15-17, wherein the plurality of sounding reference signals is mapped to a plurality of virtual sounding reference signal ports.

Clause 19: The method of any one of Clauses 15-18, wherein the indication of the one or more antenna port indexes comprises a ranked list of antenna port indexes.

Clause 20: The method of any one of Clauses 15-19, wherein the indication of the one or more antenna port indexes comprises a list of subsets of ranked antenna port indexes.

Clause 21: The method of any one of Clauses 15-20, wherein the indication of the one or more antenna port indexes is comprised within a medium access control-control element.

Clause 22: The method of any one of Clauses 15-21, wherein the indication of the one or more antenna port indexes is comprised within downlink control information.

Clause 23: The method of Clause 22, wherein the downlink control information comprises non scheduling downlink control information.

Clause 24: A processing system, comprising: a memory comprising computer-executable instructions; one or more processors configured to execute the computer-executable instructions and cause the processing system to perform a method in accordance with any one of Clauses 1-23.

Clause 25: A processing system, comprising means for performing a method in accordance with any one of Clauses 1-23.

Clause 26: A non-transitory computer-readable medium comprising computer-executable instructions that, when executed by one or more processors of a processing system, cause the processing system to perform a method in accordance with any one of Clauses 1-23.

Clause 27: A computer program product embodied on a computer-readable storage medium comprising code for performing a method in accordance with any one of Clauses 1-23.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication by a user equipment, comprising:
   one or more memories comprising instructions; and
   one or more processors configured to execute the instructions and cause the apparatus to:
      transmit, to a network entity, a plurality of sounding reference signals over a plurality of antenna ports;
      receive, from the network entity, an indication of one or more antenna port indexes associated with one or more preferred antenna ports for uplink transmissions at a rate lower or equal to a periodicity of sounding reference signal transmissions from the user equipment to the network entity; and
      transmit, to the network entity using one or more selected antenna ports of the one or more indicated preferred antenna ports, uplink transmissions, wherein a number of the one or more selected antenna ports is based on a type of at least one of the uplink transmissions.

2. The apparatus of claim 1, wherein the plurality of sounding reference signals comprises antenna switching sounding reference signal resources.

3. The apparatus of claim 1, wherein the plurality of sounding reference signals comprises codebook-based sounding reference signal resources.

4. The apparatus of claim 1, wherein the plurality of sounding reference signals and their associated antenna ports are mapped to a plurality of virtual sounding reference signal ports.

5. The apparatus of claim 1, wherein the indication of the one or more antenna port indexes comprises a ranked list of antenna port indexes.

6. The apparatus of claim 1, wherein the indication of the one or more antenna port indexes comprises a list of subsets of ranked antenna port indexes.

7. The apparatus of claim 1, wherein the one or more processors are configured to execute the instructions and cause the apparatus to determine the one or more selected antenna ports for uplink transmissions based at least in part on the indication from the network entity.

8. The apparatus of claim 7, wherein the one or more processors are configured to execute the instructions and cause the apparatus to determine the one or more selected antenna ports for the uplink transmission based on the indication from the network entity after a threshold period of time has elapsed since measuring a downlink reference signal.

9. The apparatus of claim 7, wherein the one or more processors are configured to execute the instructions and cause the apparatus to determine the one or more selected antenna ports for the uplink transmission based at least in part on an uplink antenna port selection algorithm performed by the user equipment.

10. The apparatus of claim 8, wherein the threshold period of time occurs before a relevant downlink reference signal measurement opportunity.

11. The apparatus of claim 9, wherein the one or more processors are configured to execute the instructions and cause the apparatus to:
   measure one or more downlink reference signals; and
   provide measurements of the one or more downlink reference signals obtained per antenna or polarization to the uplink antenna port selection algorithm.

12. The apparatus of claim 1, wherein the indication of one or more antenna port indexes is comprised within one or more medium access control-control elements, wherein each of the one or more medium access control-control elements indicates one of the one or more antenna port indexes.

13. The apparatus of claim 1, wherein the indication of one or more antenna port indexes is comprised within downlink control information.

14. The apparatus of claim 13, wherein the downlink control information comprises non scheduling downlink control information.

15. An apparatus for wireless communication by a network entity, comprising:
   one or more memories comprising instructions; and
   one or more processors configured to execute the instructions and cause the apparatus to:
      receive, from a user equipment, a plurality of sounding reference signals transmitted over a plurality of antenna ports;

determine, based on the plurality of sounding reference signals, one or more antenna port indexes associated with one or more preferred antenna ports for uplink transmissions;

transmit, to the user equipment, an indication of the one or more preferred antenna port indexes at a rate lower or equal to a periodicity of sounding reference signal transmissions from the user equipment to the network entity; and receive, from the user equipment, uplink transmissions transmitted using one or more selected antenna ports of the one or more indicated preferred antenna ports, wherein a number of the one or more selected antenna ports is based on a type of at least one of the uplink transmissions.

16. The apparatus of claim 15, wherein the plurality of sounding reference signals comprises antenna switching sounding reference signals.

17. The apparatus of claim 15, wherein the plurality of sounding reference signals comprises codebook-based sounding reference signals.

18. The apparatus of claim 15, wherein the plurality of sounding reference signals and their associated antenna ports are mapped to a plurality of virtual sounding reference signal ports.

19. The apparatus of claim 15, wherein the indication of the one or more antenna port indexes comprises a ranked list of antenna port indexes.

20. The apparatus of claim 15, wherein the indication of the one or more antenna port indexes comprises a list of subsets of ranked antenna port indexes.

21. The apparatus of claim 15, wherein the indication of the one or more antenna port indexes is comprised within one or more medium access control-control elements, wherein each of the one or more medium access control-control elements indicates one of the one or more antenna port indexes.

22. The apparatus of claim 15, wherein the indication of the one or more antenna port indexes is comprised within downlink control information.

23. The apparatus of claim 22, wherein the downlink control information comprises non scheduling downlink control information.

24. A method for wireless communication at a user equipment, comprising:

transmitting, to a network entity, a plurality of sounding reference signals over a plurality of antenna ports;

receiving, from the network entity, an indication of one or more antenna port indexes associated with one or more preferred antenna ports for uplink transmissions at a rate lower or equal to a periodicity of sounding reference signal transmissions from the user equipment to the network entity; and transmitting, to the network entity using one or more selected antenna ports of the one or more indicated preferred antenna ports, uplink transmissions, wherein a number of the one or more selected antenna ports is based on a type of at least one of the uplink transmissions.

25. A method for wireless communication at a network entity, comprising:

receiving, from a user equipment, a plurality of sounding reference signals over a plurality of antenna ports;

determining, based on the plurality of sounding reference signals, one or more antenna port indexes associated with one or more preferred antenna ports for an uplink transmission;

transmitting, to the user equipment, an indication of the one or more determined antenna port indexes at a rate lower or equal to a periodicity of sounding reference signal transmissions from the user equipment to the network entity; and receiving, from the user equipment, the uplink transmission using one or more selected antenna ports of the one or more preferred antenna ports, wherein a number of the one or more selected antenna ports is based on a type of the uplink transmission.

* * * * *